(No Model.) 9 Sheets—Sheet 1.

C. B. HOPKINS.
CASH INDICATOR AND REGISTER.

No. 384,691. Patented June 19, 1888.

Witnesses:
Jas. E. Hutchinson.
Henry C. Hazard.

Inventor.
Cabel B. Hopkins.
by Prindle and Russell
his Attorneys.

(No Model.) 9 Sheets—Sheet 5.
C. B. HOPKINS.
CASH INDICATOR AND REGISTER.

No. 384,691. Patented June 19, 1888.

(No Model.)  9 Sheets—Sheet 6.

C. B. HOPKINS.
CASH INDICATOR AND REGISTER.

No. 384,691.  Patented June 19, 1888.

(No Model.) 9 Sheets—Sheet 7.
C. B. HOPKINS.
CASH INDICATOR AND REGISTER.

No. 384,691. Patented June 19, 1888.

Witnesses:
Jas. E. Hutchinson
Henry C. Hazard

Inventor.
Cabel B. Hopkins,
by Prindle & Russell
his Attorneys.

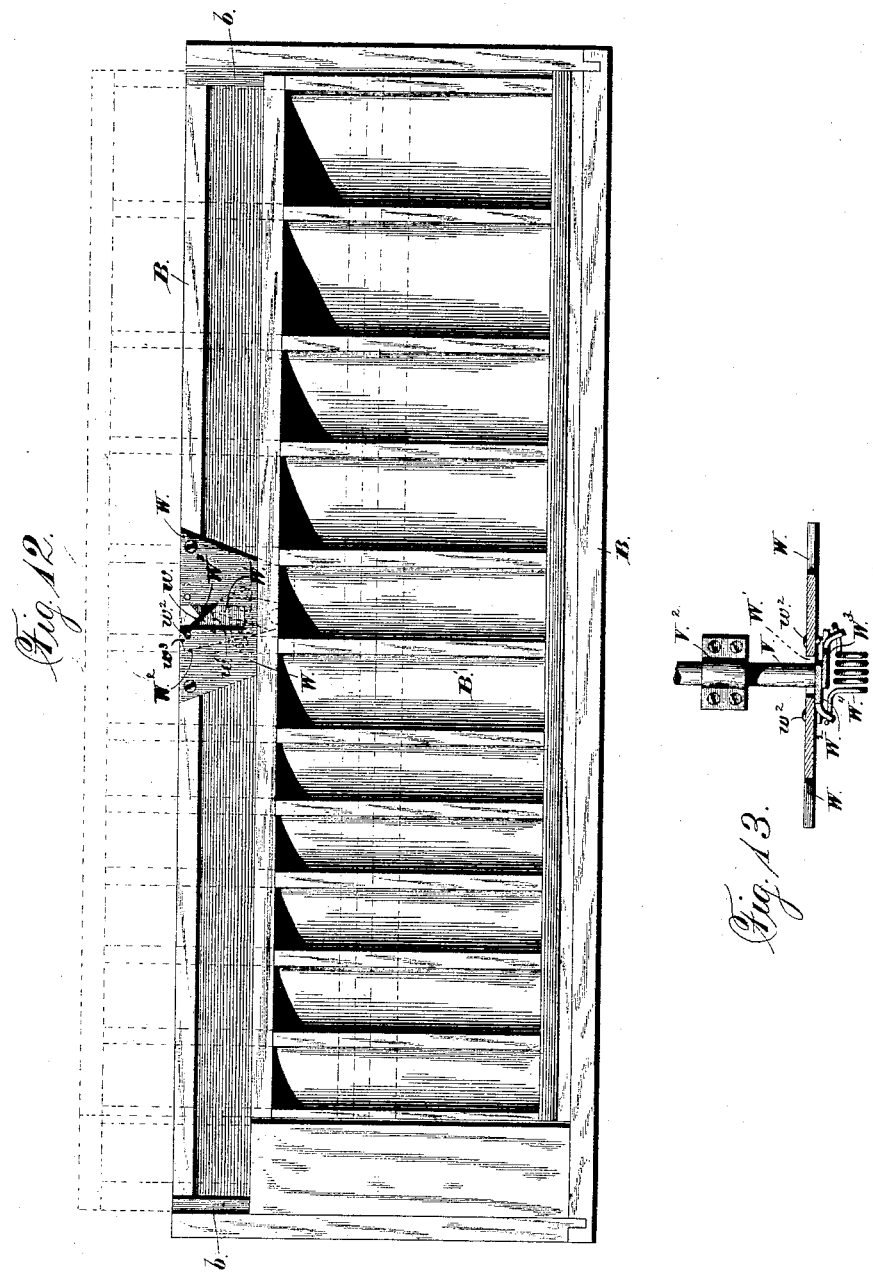

(No Model.)  9 Sheets—Sheet 9.

C. B. HOPKINS.
CASH INDICATOR AND REGISTER.

No. 384,691.  Patented June 19, 1888.

Witnesses:
Jas. E. Hutchinson.
Henry C. Hazard.

Inventor:
Cabel B. Hopkins.
by Bindle & Russell
his Attorneys.

UNITED STATES PATENT OFFICE.

CABEL B. HOPKINS, OF LOUISVILLE, KENTUCKY.

CASH INDICATOR AND REGISTER.

SPECIFICATION forming part of Letters Patent No. 384,691, dated June 19, 1888.

Application filed December 15, 1886. Serial No. 221,645. (No model.)

*To all whom it may concern:*

Be it known that I, CABEL B. HOPKINS, of Louisville, in the county of Jefferson, and in the State of Kentucky, have invented certain new and useful Improvements in Cash Indicators and Registers; and I do hereby declare that the following is a full, clear, and exact description thereof, reference being had to the accompanying drawings, in which—

Figure 1:
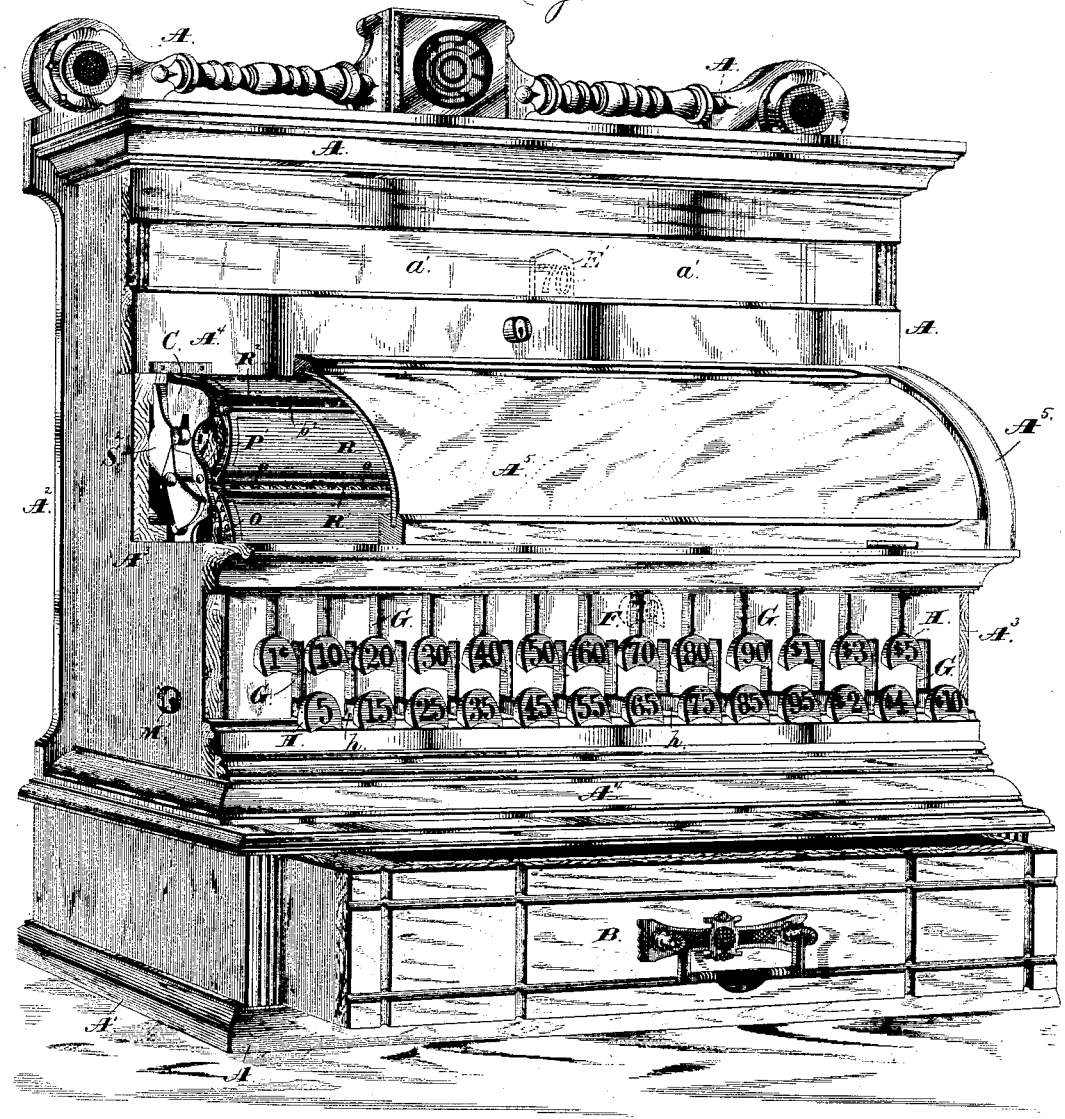
Figure 2:
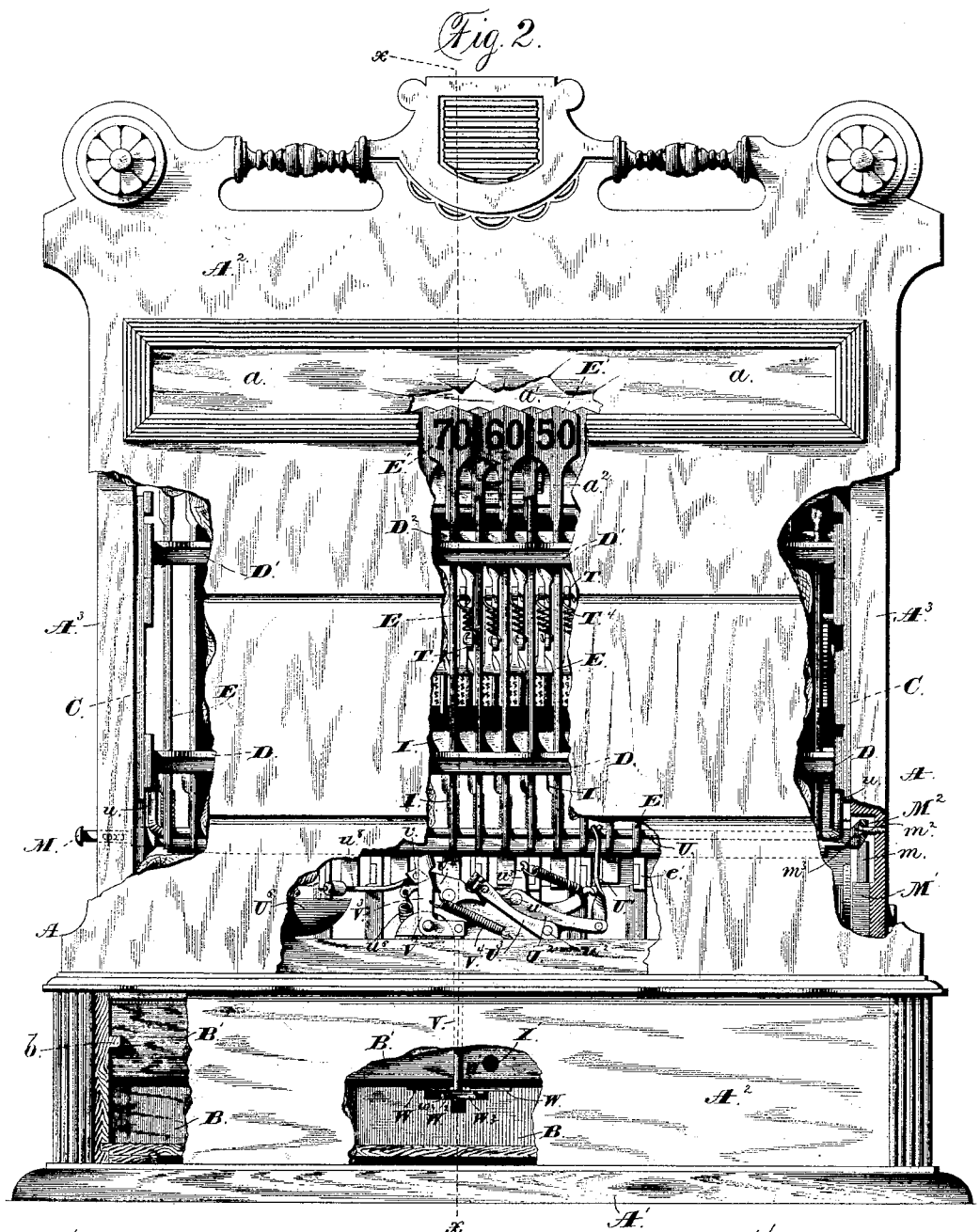
Figure 3:
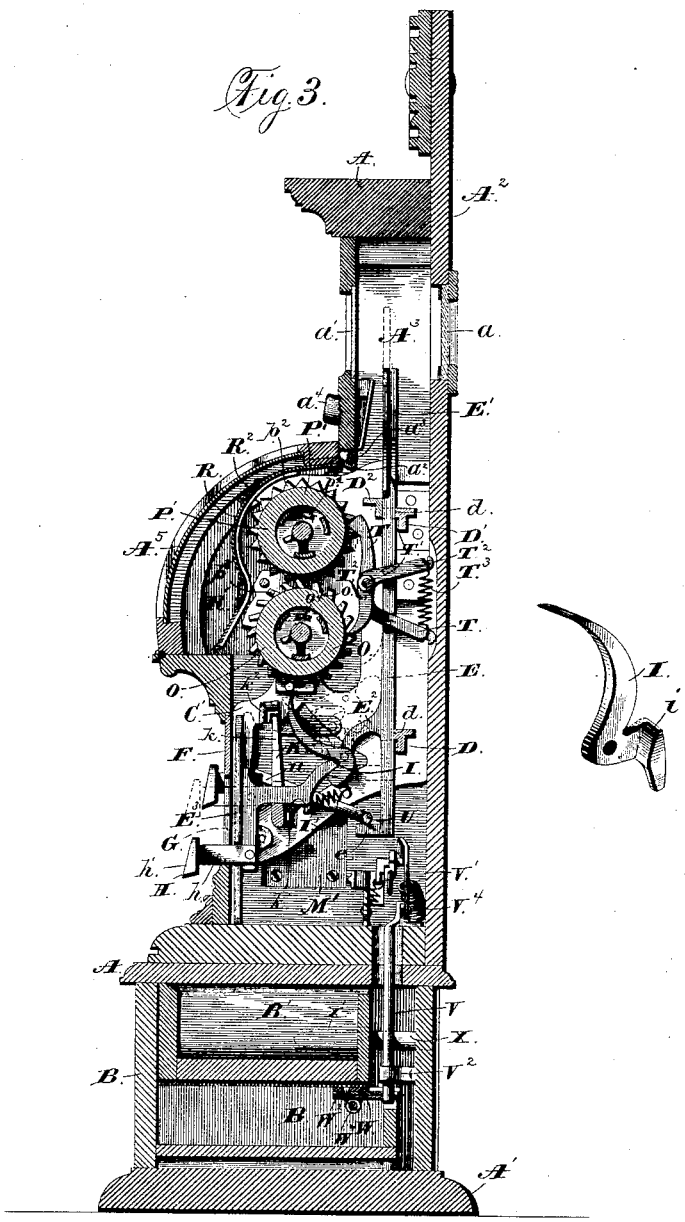
Figure 4:
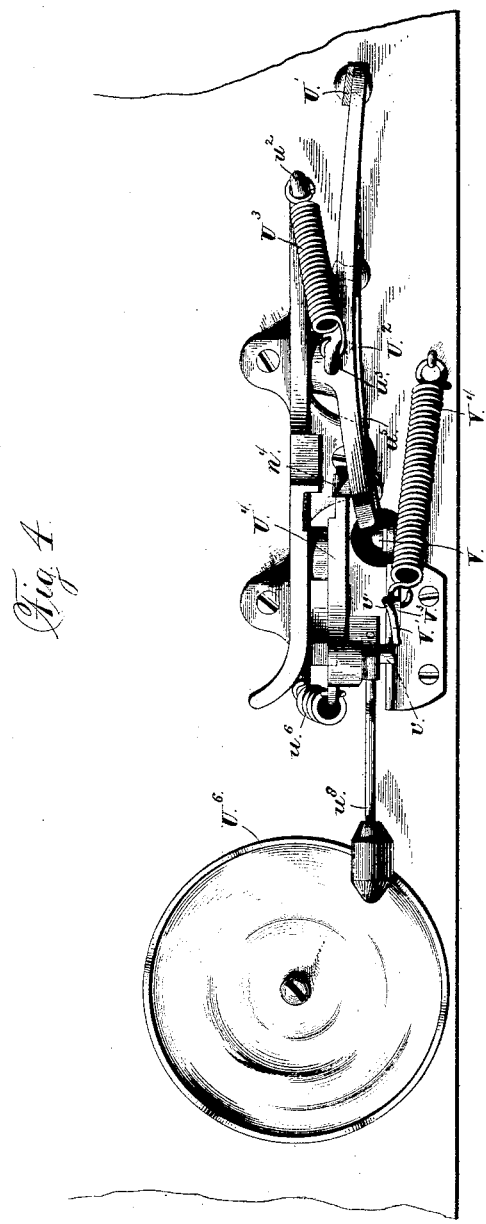
Figure 5:
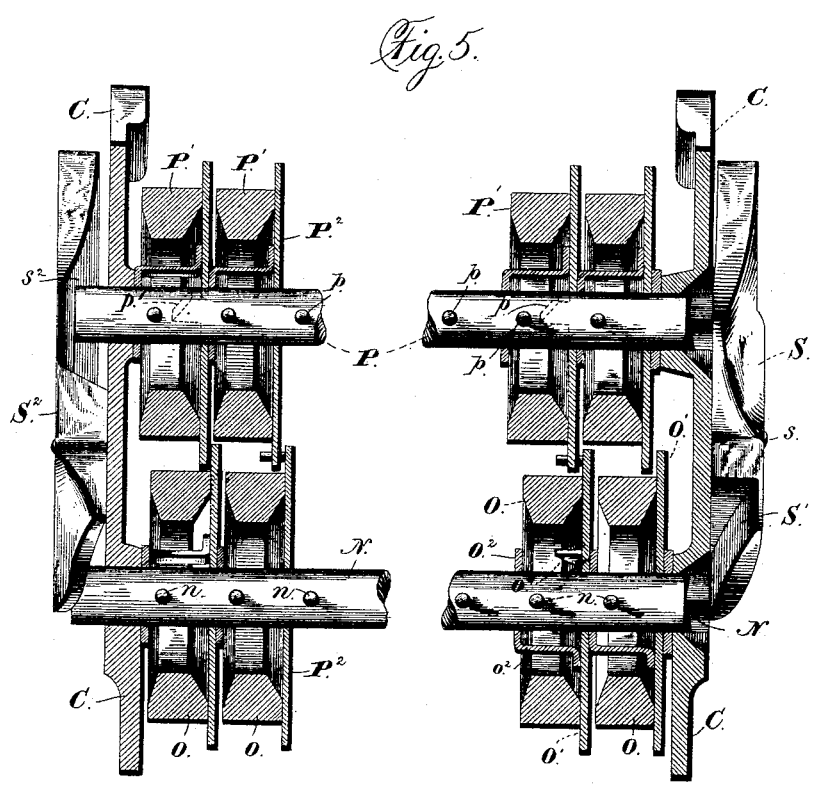
Figure 6:
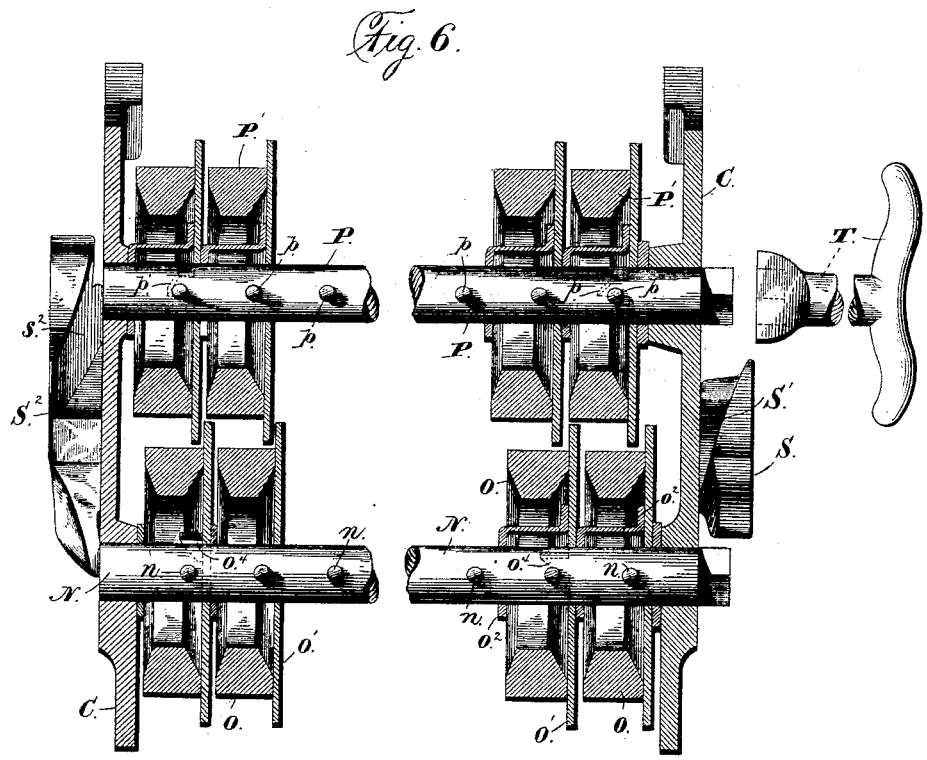
Figure 7:
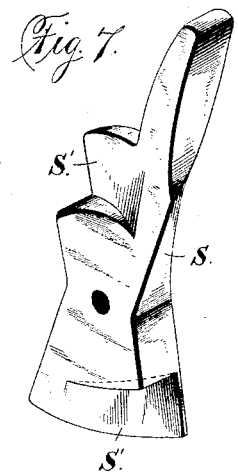
Figure 8:
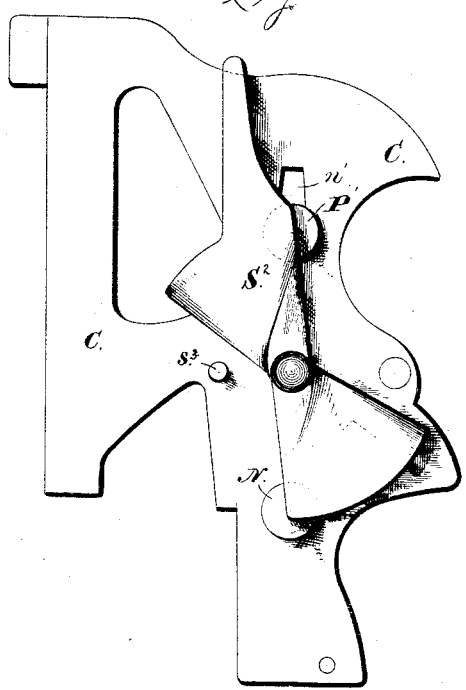
Figure 9:
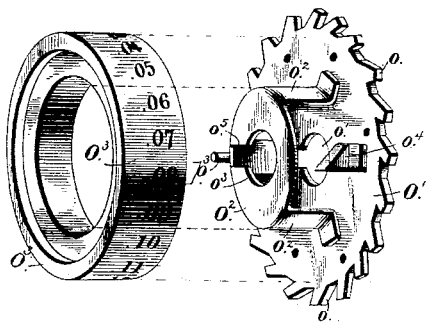
Figures 10, 11:
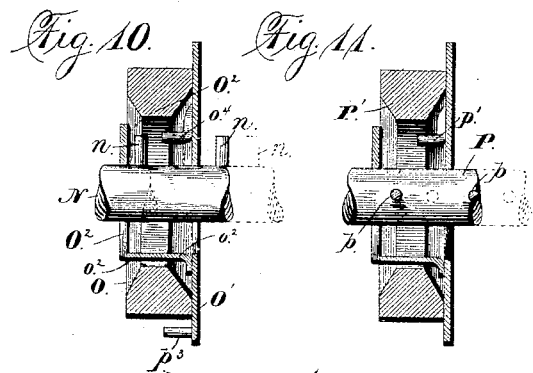
Figure 14:
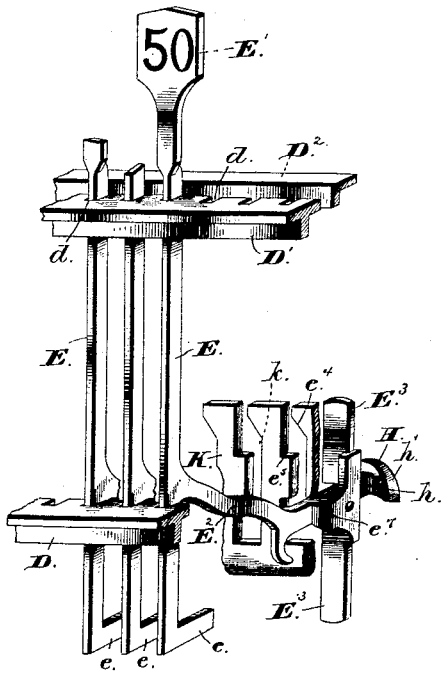
Figure 15:
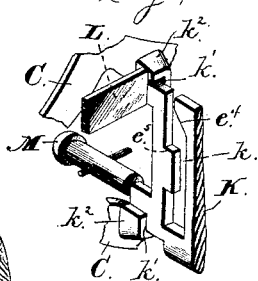

Figure 1 shows a front perspective view of my apparatus with a portion of the casing-front removed; Fig. 2, a view of the same in rear elevation; Fig. 3, a vertical sectional view on line $xx$ of Fig. 2; Fig. 4, an enlarged detail plan view of the bell and drawer-locking mechanism; Fig. 5, an enlarged detail view of the registering-wheels and shaft-shifting devices in position, as when the apparatus is ready for operation; Fig. 6, a similar view with the shafts shown as shifted to prepare for setting the wheels back to zero; Fig. 7, a detail view of the device for moving the register-wheel shafts into their normal positions and holding them there; Fig. 8, a similar view of the device for shifting the shafts into position for setting the wheels; Fig. 9, a detail perspective view of one of the lower register-wheels; Fig. 10, a detail sectional view of the same, showing in full lines the supporting-shaft as it normally stands, and in dotted lines as situated for setting the wheel back; Fig. 11, a similar view of one of the upper register-wheels and shaft; Fig. 12, a detail plan view of the cash-drawer, showing the device for engaging the locking-bolt; Fig. 13, a detail sectional view of such device, showing the parts in position as when the drawer is unlocked; Fig. 14, a detail perspective view of a few of the indicator-rods and the guiding means therefor, together with a portion of the locking-bar; Fig. 15, a detail perspective view showing the means for supporting one end of the locking-bar, and Fig. 16 a similar view of the means for supporting the other end of such bar and locking the same.

Letters of like name and kind refer to like parts in each of the figures.

The object of my invention is to provide an improved cash indicating and registering apparatus; and to this end my invention consists in the construction, arrangement, and combination of parts, as hereinafter specified.

In the drawings, A designates the casing of my apparatus, consisting, essentially as shown, of the base A', within which is the cash-drawer B, (to be hereinafter described,) the vertical back, $A^2$, having the glass-closed display-opening $a$ near its top, the vertical sides $A^3 A^3$, and the front $A^4$, part of which is formed by the convex or curved cover $A^5$, hinged at its lower edge to the casing-front, as seen in Fig. 1.

The upper portion of the casing-front is provided with a display-opening, $a'$, closed with glass, like that in the casing-back.

The hinged portion of the casing-front is provided at its upper edge with a tongue, $a^2$, (see Fig. 3,) curved upward, so as to be in position to be engaged by the bolt $a^3$ of the lock $a^4$ on the fixed upper portion of the casing when it is desired to lock the hinged portion or cover shut.

Fastened to the inner sides of the casing-sides $A^3 A^3$ are the plates C C, preferably of metal, forming frame-plates for the support of the mechanism, to be hereinafter described.

Extending across within the back of the casing are the two bars D and D', one vertically above the other, and both fastened at their ends to the plates C C. I make these bars preferably in a T form, as shown. The front edges of the plates forming the tops of such bars are provided with the series of corresponding notches, $d\ d$. These are preferably made rectangular in shape in order to receive and fit the flat vertical rods E E, which carry on their upper ends the indicator plates or tablets E' E', marked, as shown, on both their front and back sides with the desired indicating-numbers.

In order to save room and provide for the use of broad indicating-plates, I set such plates alternately to the rear and front sides of the rods E E throughout the series of the latter. With this construction the front tablets overlap the rear ones, so as not to interfere with their upward movement as the rods carrying them are raised. Any one or more of the tablets can be raised freely above the rest of the series of tablets, as desired, by moving the proper rod or rods.

To hold the upper portions of the indicator-rods E E in place in their respective notches $d\ d$ in the upper guide-bar, D', I provide the bar $D^2$, extending across in front of the series of rods, so as to engage their front sides or edges, and fastened at its opposite ends to frame-plates C C. The upper ends of the indicator-rods will thus be steadied and guided in their vertical movements by the notches $d$ $d$ and bar $D^2$. Said rods extend down below the guiding-notches in the lower bar, D, and at their lower ends are provided with the arms $e$ $e$, extending forward at right angles to the rods.

From the rods E E, at about the level of the lower guide-bar, D, rigid arms $E^2$ extend forward and downward and then horizontally forward. The front ends of these horizontal portions of the arms are provided with the upright plates $E^3$ $E^3$, situated directly in rear of the plate F on the casing-front. This plate is preferably formed of metal and rigidly attached to forwardly-extending portions C' C' of the frame-plates C C. It has two series of vertical slots G G extending across its face, one series being above the other and so arranged that its slots are opposite the spaces between the slots in the lower series. Each one of the slots is opposite the forward end of one of the rigid arms $E^2$ $E^2$ on the indicator-rods E E, and is closed by the plate $E^3$ on such rigid arm. Said plate is made long enough to always close its respective slot as the arm $E^2$ is moved up and down with its indicator-rod. The alternate arms $E^2$ $E^2$, which come opposite the slots G G of the lower series, are preferably extended at their front ends down behind the plates F F, as shown in the drawings, Figs. 2 and 3. Attached to these arms and extending forward through the respective slots in the plate F are the key-pieces H, consisting of short bars $h$, having on their front ends the tablets or key-plates $h'$, marked, as shown, to correspond with the markings on the respective indicator-tablets with which they are connected, as described. Similar key-pieces, H, are attached to the indicator-arms $E^2$ $E^2$, which come opposite the slots in the upper series or bank, extending out like the others through their respective slots.

The key-plates used can be of any desired shape; but I prefer them, as shown, shaped and inclined like those described and shown in my United States Patent No. 347,296. Upon the apparatus described, shown, and covered in such patent my present apparatus is intended as an improvement.

For the best attachment of the key-pieces H H to the arms $E^2$ $E^2$, so as to be in line therewith, I make a side offset, $e^7$, in each arm and attach the bar $h$ of the key-piece to the arm with its end fitting in such offset. I show the indicator-tablets and their respective key-plates as marked with figures indicating successively greater sums, beginning at one end of the series.

In the drawings the indicator-plate and key-plate at the left of the series are marked to indicate one cent. The next key and indicator-plate are marked to indicate five cents, the next ten, the next fifteen, and so on up to and including ninety-five. The next succeeding key, with its corresponding indicator-plate, is marked to indicate one dollar, the next two dollars, and so on up to and including five dollars, the last being marked to indicate ten dollars. I do not, however, limit myself to such arrangement or marking, as the same can obviously be varied as desired, and the number, as well as the marking of the keys and indicator-plate, can be changed to suit any intended use of the apparatus.

Pivoted to each one of the rigid arms $E^2$ $E^2$ of the indicator-rods is a pawl, I, whose operative part extends forward and upward into position to engage the teeth on a register-wheel, to be hereinafter described. A spring, I', attached to the lower end of this pawl below its pivot and to a lug on the arm $E^2$, serves to keep the pawl normally in position to engage the teeth on the register-wheel when the arm is raised to raise an indicator-rod. A shoulder, $i$, on the pawl, striking against the under side of the arm $E^2$, serves to limit the swing of the pawl under stress of the spring I', so that the pawl end is out of contact with the respective register, to be described, when the arm is down.

With the construction of the apparatus as already described hereinbefore, to indicate any desired amount all that is necessary is to place the finger under the proper key, as indicated by the mark on the key-plate, and force the same upward, thus elevating the desired indicator-tablet, so as to display its number or mark through the display-opening in the upper portion of the casing.

To lock a raised indicator-rod in its elevated position, I provide the slotted reciprocating locking-bar K, (see Figs. 3, 14, 15, and 16,) like that fully described and shown in my patent referred to above and operating in the same way. As the construction and operation of such locking-bar are fully set forth in said patent, they need not be further described in the present application. The horizontal forward portions of arms $E^2$ $E^2$ pass through and engage the slots $k$ $k$ in the bar in precisely the same way as do the horizontal portions of the indicator-rods in my patented apparatus. Said bar is at its ends supported and slides in sockets $k'$ $k'$ on the frame-plates C C. It is held upright by lugs $k^2$ $k^2$ on the frame-plates engaging the front side of the upper edge of the bar, these lugs being preferably rabbeted or provided with recesses, so as to engage the top as well as the front of the bar. To hold the bar in place against such lugs, while allowing it to reciprocate freely, I provide the swinging plates L L, pivoted to the frame-plates C C (see Figs. 15 and 16) and adapted to be swung down so as to engage with their ends the rear side of the locking-bar, as shown in the drawings. With this construction the said bar K can be cast or made of rigid material and can still be inserted in place or removed readily without springing or bending.

Figure 16:
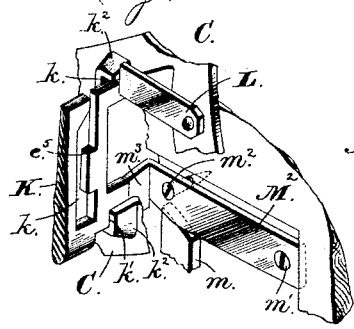

To move the locking-bar so as to cause it to unlock any indicator that may have been raised and locked, I provide the push-pin M, (see Figs. 2 and 15,) so situated that its inner end is in position to engage the bar. To lock the bar against reciprocation, I provide, instead of the lock having the beveled bolt engaging the end of the bar directly, as shown and described in my patent referred to, a lock, M', with its bolt $m$ beveled, as shown in Fig. 16, and adapted to engage with its bevel the outer side of the swinging piece $M^2$ within the casing. Such piece is loosely attached by screw $m'$ to the casing, and is guided in its movements by the pin $m^2$, passing through a hole in it. On the end of this swinging piece is the lug $m^3$, adapted to engage the end of the locking-bar.

Journaled upon a shaft, N, supported in bearings in side plates, C C, are the register-wheels O O, one for each indicator, and so situated as to be engaged by the pawl I, carried by the arm on the indicator-rod, as described hereinbefore. Each of these wheels consists, essentially, of the cylindrical plane portion, with the series of ratchet-shaped teeth $o$ $o$ projecting radially beyond the cylindrical portion of the wheel at one side thereof. Upon the plane portion of the wheel is marked or placed a series of numbers beginning with 0, and then starting with the sum marked on the tablet and key-plate of the indicator whose pawl engages the teeth on the wheel and increasing successively by such sum around the wheel—that is, the lowest number after the zero being the sum indicated, the next number is twice that, the next three times, &c.

The ratchet-teeth $o$ $o$ are preferably formed, as shown, on a metal disk, O', which has the journal-opening $o'$ for the wheel. Attached to this disk by means of arms or distance-pieces $o^2$ $o^2$ $o^2$ is the disk or plate $O^2$, also provided with a journal-opening, $o^3$, to engage the supporting-shaft.

The cylindrical or plane portion of the register-wheel is formed of an annular block, $O^3$, preferably of wood, surrounding the plate $O^2$ and the attaching-arms $o^2$ $o^2$ and attached to the toothed disk O'. Within this annular block this disk is provided with a tooth or lug, $o^4$, beveled on its front side with reference to the direction of rotation of the wheel. At the same side of the journal-openings in disk O' and plate $O^2$ is an offset or notch, $o^5$, for a purpose to be described. On the shaft N is a series of pins or teeth, $n$, one for each wheel, so situated that when the bar is moved longitudinally in one direction the wheels can turn freely on the shaft without the teeth $o^4$ $o^4$ within them engaging the teeth on the shaft. When the shaft is slid in the opposite direction—that is, to the right—the pins or teeth $n$ $n$ will then be in position to engage the teeth $o^4$ $o^4$ on the wheel when the shaft is turned.

The teeth $o^4$ $o^4$ within the several register-wheels all have the same situation with reference to the zero-marks on the wheels. With this construction, if the shaft, being in the position just described, be turned until its teeth $n$ $n$ engage the abrupt rear sides of the lugs or teeth $o^4$ $o^4$ within the register-wheel, the zero-points on the series of wheels will obviously be in line with each other and will continue so as long as the shaft is turned in the same direction to further revolve the wheels. The offsets or notches $o^5$ $o^5$ at the sides of the journal-openings $o'$ in the wheels allow the passage of the pins $n$ $n$ on the shaft as the wheels are being put in place on the latter. A similar offset, $n'$, at the upper side of the shaft-receiving opening in the plate C, at the left side of the apparatus, allows the shaft, with its pins, to be inserted longitudinally in its place or removed therefrom at will. Above the shaft N is a similar shaft, P, supported in like manner in the frame-plates C C, and provided with the longitudinal series of teeth or lugs $p$ $p$, like those on shaft N. The register-wheels P' P', journaled on this shaft, are just like the register-wheels O O, except that the teeth on the disks $P^2$ at the sides of the wheels are different in shape and the lug or stud $p'$ within each wheel is inclined or beveled on the side opposite to that on which the teeth or lugs $o^4$ $o^4$ are beveled.

The beveling of the teeth $o^4$ $o^4$ and lugs or studs $p'$ $p'$ on their forward sides with reference to the directions of rotation of the respective register-wheels, insures that the teeth and lugs or studs shall not catch upon the teeth or pins on the register-wheel shafts during the forward rotation of the wheels, even if the shafts should not be moved longitudinally to their fullest extent. If, by accident, a register-wheel shaft should not be moved quite far enough to carry the pins or studs on the shaft out of the paths of the teeth or lugs on the register-wheels as the latter are revolved, the inclined side of a tooth on a wheel coming in contact with the respective pin on the shaft will simply cause the latter to move longitudinally into its proper position to allow the wheels to be revolved freely.

The teeth $p^2$ $p^2$ on the disks are preferably inclined equally on opposite sides, as shown.

On each of the lower register-wheels, O O, is a pin, $p^3$, which at each complete revolution of the wheel engages a tooth on the respective upper register-wheel and turns the latter through the distance represented by one tooth.

The markings on the lower and upper series of register-wheels are arranged, just as fully described in my said patent, to show at suitable display-openings the sum of the amounts indicated at various times.

Within the swell or convex part of the front of the casing, which is closed, as described, by the lock lid or cover $A^5$, is a sheet-metal shield, R, having the two parallel longitudinal slots or openings R' $R^2$, through which can be seen the numbers or marks on the lower and upper series of register-wheels.

To hold the shafts N and P normally in position, so that the pins or teeth $n$ $n$ and $p$ $p$ thereon will be out of the way of the teeth $o^4$ $o^4$ and $p'$ $p'$ on the register-wheels O O and P' P', leaving such wheels free to revolve on the respective shafts, I provide the double cam-lever S, pivoted at $s$, between the shaft ends, to the frame-plate C at the right of the machine. On diametrically-opposite sides of its pivot this lever has portions moving close to the face of the plate C. When these portions are brought over the ends of the shaft, by swinging the lever the shafts will obviously be held as moved longitudinally to the left side of the apparatus in the position in which their teeth or pins are cleared by the studs on the wheels. On opposite sides of the lever and of its pivotal point are the cam or inclined faces S' S', which, if the lever should be turned to disengage it from the shaft ends and such ends should be protruded beyond the face of plate C, would, upon turning the lever back again, engage said shaft ends and force them inward again to move the shafts longitudinally. A similar cam-lever, $S^2$, is pivoted to the left frame-plate C, between the shaft-bearings, but has its cam-surfaces $s^2$ $s^2$ preferably inclined in the opposite directions to those on lever S. With this construction the lever S, having been swung on its pivot $s$ to release the shaft ends, if the lever $S^2$ be swung forward, as indicated in Fig. 6, its inclines or cams will engage the shaft ends so as to move them inward toward the right until the plane parts of the lever come over such ends and hold them as moved inward. Such inward movement of the shafts brings their respective teeth or pins $n$ $n$ and $p$ $p$ into position, so that as the shafts are revolved, as they can be by means of a key, T, fitting their projecting squared ends, the pins will engage the studs on the register-wheels, as described hereinbefore. The shafts are shifted back again into their normal positions by swinging lever $S^2$ to release the shaft ends and swinging the lever S, so that its inclines ride over and force the right-hand ends of the shafts inward, and the lever reaches its position first described.

A stop, $s^3$, on the plate C serves to stop the lever $S^2$ when it has been swung into its normal position out of engagement with the shafts. Such a stop can also be provided for holding the lever S in its normal position, or the lever can be, as lever $S^2$ is shown in Fig. 1 simply swung up against the casing.

To keep the upper register-wheels, P' P', from turning backward during the registering, I provide a series of pawls, T T, pivoted on the rod T', extending across within the apparatus; also pivoted upon the rod are the pawls $T^2 T^2$, engaging the teeth on the register-wheels O O. To hold these pawls against the respective wheels, I provide a spring, $T^3$ $T^3$, connecting arms on pawls T T with corresponding arms on the next adjoining pawls, $T^2 T^2$. With this construction one spring serves to hold two different pawls to their work.

Pivoted at its opposite ends in the plates C C is the swinging frame U, consisting of the bar extending over and resting on the series of arms $e$ $e$ on the lower ends of the indicator-rods E E, and the forwardly-extending portions $u$ $u$, pivoted as described. Connected with the longitudinal bar of the frame U by means of a link, U', on a suitable standard, is the lever $U^2$, pivoted on a stud, $u'$, so as to swing in a vertical plane. A spring, $U^3$, attached to a fixed lug, $u^2$, and to an arm, $u^3$, on the lever $U^2$, acts to swing that end of the lever downward which is connected, as described, with the frame U, and so acts to draw such pivoted frame down.

As any one or more indicator-rods are raised to make an indication, the arms $e'$ $e'$ on the rods will raise the frame U up against the stress of the spring on the lever, and when the indicator rod or rods have been released the spring, through the lever-link U' and frame, will return them all quickly to their normal position. This construction, manner of, and means for causing the indicator-rods to drop quickly, are substantially the same as fully shown and set forth in my said patent.

On the lever $U^2$ is a bevel-ended sliding pin, $u^4$, forming a pawl projecting from the front side of the lever and normally held in such position by the flat spring $u^5$, to which it is attached. Pivoted on a stud on the same standard with the lever $U^2$ is the lever $U^4$, carrying the bell-striker $u^8$ on one end and having its other end so situated as to be engaged by the projecting pin $u^4$ on lever $U^2$. As the pin-carrying arm of the latter swings down, the abrupt side of the pin $u^4$ first strikes a portion of the striker-lever $U^4$ and depresses it, so as to raise the striker, and then passes out of engagement with the lever $U^4$. A spring, $u^6$, then draws the striker down quickly to strike the bell $U^6$. The pin $u^4$ does not pass out of engagement with the striker-lever until the lever $U^2$ approaches the end of its swing—that is, until the indicator-rod has been raised far enough to indicate and also to register. As the frame U swings down, carrying any elevated indicator with it, the pawl-pin $u^4$, engaging the striker-lever with its bevel side, rides over the same easily without moving it.

It is desirable to provide means for locking the cash-drawer B until an indication and registration has been made, and then automatically unlocking it. To this end I have provided the vertically-reciprocating bolt V, pivoted at its upper end to the elbow-lever V', and at its lower end guided in a guide-lug, $V^2$. The elbow-lever V' is preferably made of flat or sheet metal, so that the upper end of its upright arm $V^3$ can spring a little in a direction at right angles to the plane of motion of the lever. Such upper end of the upright arm stands close beside the outer end of the striker-carrying lever $U^4$, provided with a pin, $v$, and has on its inner side a forwardly-inclined lug, $v'$, in position to be engaged on its front side by the pin $v$ as the striker-lever rises preparatory to making a stroke on the bell. Said pin $v$, engaging the inclined lug $v'$, springs the arm V³ rearward, and then passes inward off of the lug, allowing the said arm to spring back again to bring the lug into position to be engaged on its inner edge by the pin $v$ as the striker-lever falls again. By such latter engagement the pin forces the lever-arm V³ back, so as to raise the bolt V quickly. The pin passes then down off the edge of the lug $v'$ and the spring V⁴ swings the lever V' back to its normal position again if the bolt V is not stopped, as will be described.

At the rear edge of the cash-drawer B is the plate W, provided with the slot W' in line with the lower portion of bolt V. Pivoted on the under side of this plate, forward of the slot W', is a swinging plate, W², adapted to swing inward across the slot, as shown in Fig. 12. The rear end of the plate is cut at an angle, as shown at $w$, so as to present an inclined edge extending across the rear end of slot W'. Also pivoted on the plate W, forward of the slot, is another swinging plate, W³, below plate W², and having its rear end cut at an angle like that of plate W², but in the opposite direction. This plate W³ is, forward of the inwardly-inclined edge thus formed, provided on its inner side with a ratchet-shaped notch, $w'$. The angular cut of the front end of this plate W³ together with this notch leaves a ratchet-shaped projection on the inner side of the plate, making the latter like a swinging pawl. The two plates W W³, while pivoted on the same pin, swing in opposite directions inward toward each other and across the slot W'. A spring, W⁴, attached to both plates, draws them inward, while stop-pins $w^2$ $w^2$, engaging shoulders $w^3$ $w^3$ on the plates, limit their inward swing. With the bolt V down in its normal position, if the drawer, being open, be pushed in to close it, the inclined edges of the two plates W² and W³ will engage the bolt, so that the plates will both be swung outward. As soon as the pawl projection on plate W³ has passed the bolt, it will be thrown in behind the bolt by the inward swing of the plate W, so as to effectually lock the drawer. If, now, the bolt be raised, as described hereinbefore, until its lower end is above the two plates W² and W³, the upper plate will swing inward under the bolt to close the slot. The bolt, upon being allowed to drop, will then rest upon this upper plate, W², and the drawer remains unlocked until it is opened and closed again.

I have shown the drawer as consisting of the main or outer part, B, whose rear edge is cut down and carries the plate W, and the inner drawer, B', sliding within the main part on suitable guide-ribs, $b$ $b$, engaging grooves in the ends of the inner drawer. At the left side of the drawer I show a cleat or bar extending over and fitting a rabbet or depression in the upper side of the inner drawer; but I do not intend to limit myself to any such construction.

I also show a guide-post, X, projecting forward from the back of the drawer-recess in the base of the apparatus, and engaging an opening or socket, X', in the inner drawer.

The operation and manner of working my apparatus are as follows: With the drawer closed and the locking-bar locked by the locking device described at the left side of the casing, none of the keys can be raised. They are all held down by the shoulders at the left-hand side of the lower ends of the slots in the locking-bar, which shoulders are now directly over the arms E² E² of the indicator-rods. As the bolt locking the drawer is only actuated through the medium of the bell-striking mechanism, and as such mechanism can only be operated by raising one of the keys, obviously the drawer will remain locked, so that it cannot be opened until the indicating and registering have been commenced again. When it is desired to use the apparatus, the locking-bar is unlocked at its left end and pushed toward the left by means of the push-piece M. The upright portions of the slots in the bar are thus brought over or in line with the portions E² E² of the indicator-rods with which the keys are connected. Any one or more of the keys can now be raised at a time to display the respective indicator disk or disks. As the bell-striking mechanism is connected with the swinging frame U, which rests on all the arms $e$ $e$ when they are down, it follows that the raising of any one or more keys at a time will cause the alarm mechanism to sound the alarm. As a key is raised far enough to show its respective indicating-disk and cause the alarm to be sounded, the arm E², connected with the key, engages the incline $e^4$ at the right-hand side of the upper end of the slot in the locking-bar, and so forces said bar over to the right to bring the shoulder $e^5$ on the other side of the slot under the arm E². The key will thus be held elevated until the locking-bar is pushed to the left or inward again by the push-piece. The shoulder $e^5$ then passes out from under the arm E², and the latter drops down in the slot to its original position. Any other key or keys can now be raised for a new indication. As stated hereinbefore, the locking-bar is substantially the same in construction and operates in the same way with the arms on the indicator-rods as does the locking-bar fully shown, described, and claimed in my United States Patent No. 347,296. As a key is raised to elevate a certain indicating disk or tablet, the swinging frame U is raised, and through the link U' swings the trip-lever U², with its spring-pawl $u^4$, so as to cause the end of the hammer-lever to descend so as to raise the hammer against the stress of spring $u^6$. As the striking or hammer-carrying end of lever U⁴ rises, the pin $v$ thereon engages the inclined surface on the spring-arm of the lever, and springs such arm outward. When the pin passes this incline, the top of the arm of lever V' springs in behind the pin into position to be struck by the striking-lever as it falls. This such lever does as soon as the pawl $u^4$ on the trip-lever U² passes off of the lever end, as it does so just as the swinging frame U reaches the limit of its upward motion, and the indicator-key is raised far enough to move the locking-bar into position to lock said key in its elevated position. The quick blow which the pin $v$ on the strike-lever gives the upright arm of lever V' causes the other arm of such lever to raise the drawer-locking bolt up above both the swinging plates $W^2$ $W^3$ on the drawer. Said plates then swing inward, so that when the bolt falls again, as it does under the action of spring $V^4$ drawing upon lever V', the bolt end rests upon the upper plate and the drawer is free to be opened. Meantime the hammer on the strike-lever has struck an alarm-stroke on the bell. An indication has now been made, the alarm has been struck to call attention to the fact, the cash-drawer has been unlocked, and the indicator-key is locked in an elevated position.

It will be observed that with my construction, as described so far, the alarm is not struck until a full indication has been made and the indicator rod or key locked by the locking-bar. It will also be especially observed that, as the drawer-locking bolt is only tripped by the swing of the alarm-striking lever as the same moves to deliver a stroke on the bell, the drawer cannot be unlocked without sounding an alarm. It follows, also, obviously, from the connection of the alarm mechanism with the indicator-keys, that the drawer cannot be unlocked until a complete indication is made. As an indicator key and rod or bar is raised, the pawl thereon engages a tooth on the respective register-wheel O in the lower series of wheels and turns such wheel one tooth, thus bringing opposite the display slot or opening the number on the wheel representing an amount greater by the amount marked on the indicator-disk than the amount represented by the marking on the wheel which was previously opposite the display-slot.

As already described hereinbefore, when one of the lower register-wheels has thus been turned through one revolution to bring all of its series of markings opposite the display-slot, the corresponding register-wheel P' in the upper series is moved one tooth by the engagement of the pin $p^3$ on the lower wheel with a tooth or cog on the upper. The upper wheel will then show through the upper display slot or opening a number giving the sum of the indications registered by the lower wheel. The amounts indicated for any period of time can then be easily ascertained by taking the amounts shown by the upper wheels and adding to them the amounts shown by the lower wheels.

The wheels in the two series or banks are capable of free rotation forward, but are held from backward rotation by the pawls T $T^2$, respectively, engaging the teeth of the wheels of the two series, as already described hereinbefore.

The apparatus can at any time be securely locked from operation, and the cash-drawer fastened securely from any unlocking, by simply locking the bar K by means of lock M'.

The drawer having been closed so as to be held by its bolt, and the indicator-keys being locked, as described, there is no way by which the drawer can be unlocked until the keys have been unlocked and a full indication has been made with its necessarily attendant alarm.

When, after any desired time of use of the apparatus, it is desired to set the register-wheels back to zero again to begin a new series of registrations, the following simple operations are all that are necessary: The hinged front $A^5$ of the casing is unlocked and swung down, just as it is when the numbers on the register-wheels are to be read through slots R' and $R^2$. The double cam-lever S at the right of the apparatus is then swung by pulling its upper end forward and downward to cause the lever to disengage the ends of the shafts N and P, upon which the upper and lower series of register-wheels are respectively journaled. The shafts are thus left free to be moved longitudinally to the right. The double cam-lever $S^2$ at the left-hand side of the frame is now swung down so that its inclines or cam-surfaces $s^2$ $s^2$ engage the ends of the two shafts N and P and force such ends inward, thus moving the shafts bodily to the right, so that their squared key-receiving ends project out beyond the frame-plate in which such ends are supported. This movement of the shafts not only projects their key-receiving ends, but brings the series of fixed pins $n$ $n$ $n$ and $p$ $p$ $p$ on the respective shafts into position to strike the lugs $o^4$ $o^4$ and $p'$ $p'$ within and on the respective register-wheels N N and P P if the shafts are turned. The key T is now placed on the end of the lower shaft, N, and such shaft is turned to the right, or in the direction of the forward rotation of the register-wheels O O on the shaft. As the shaft is thus rotated, it turns independently of the several wheels until the pins $n$ $n$ come in contact with the rear or abrupt sides of the lugs $o^4$ $o^4$ within the wheels. As the pins reach and engage the lugs on the various wheels in the series, continued rotation of the shaft causes such wheels to rotate together with the shaft. These lugs are on all the wheels, as stated hereinbefore, situated in the same positions with relation to the zero-points of the respective wheels. It follows, then, that as the shaft is rotated so as to take up or engage the lugs on all the wheels, the zero-marks on all the wheels will then be in line with each other, and also all the pins $n$ $n$ on the wheels will be in line. The shaft is turned by the key until all the wheels are thus taken up and until the pins $p^3$ $p^3$ on the wheels come into engagement with the teeth $p$ $p$ on the register-wheels of the upper series. The key is now removed from the lower shaft and placed on the upper one, which is then turned to the left, or in the direction of the forward rotation of the register-wheels on it, until the pins $p\ p$ have taken up and engaged all the lugs within the wheels and all the wheels have been turned so as to carry the pins $p^3\ p^3$ on the lower wheels to the rear, rotating all such lower wheels through the distance of one tooth. The key can then be put on the lower shaft and the latter turned to bring the zero-marks on the lower wheels opposite the desired point. The key can then be replaced on the upper shaft and such shaft turned to rotate its wheels to bring their zero-marks to the display-opening.

If the upper wheels have their zero-marks in line at the time of setting, or if the upper shaft is first turned to bring these wheels into such position and then the lower shaft is turned, as described, to bring the zeros on the lower wheels into line, and the pins $p^3\ p^3$ on such wheels all into engagement with the upper wheel-teeth, it is enough to give the upper shaft a rotation to the left to rotate the wheels one cog. The key can then be placed on the lower shaft and the lower wheels moved one cog, which will bring their zeros around to the display slot or opening. The upper shaft can then be rotated by the key to bring the zeros of its register-wheels around to the proper position opposite the display-opening. The setting being completed, the cam-lever at the left is first swung up to disengage the shaft ends, and then the lever at the right is swung up so as to cause its cam-surfaces or inclines to engage the shaft ends and force them inward, thus moving the shafts longitudinally to the left, so as to carry the pins $n\ n\ p\ p$ thereon out of position for engaging the lugs $o^4\ p'$ on the register-wheels.

In my other pending application, Serial No. 207,096, I have covered, broadly, by claims the combination of a series of register-wheels with fixed lugs or teeth, in combination with the longitudinally-movable and rotary setting-shaft, having the lugs or pins adapted to be brought into and out of position to engage the lugs, shoulders, or teeth on the wheels by longitudinal movement of the shaft. I do not therefore claim such combination, broadly, in this present application. Nor do I claim in this case anything claimed in said other pending application.

Having thus described my invention, what I claim is—

1. In combination with the upper and lower guide-bars provided with the series of corresponding guide-notches, the indicator-rods guided in such notches and having the forwardly-extending arms at or near their lower ends, plates on such arms parallel to the rods, a fixed plate engaging such plates, and means for holding the upper ends of the rods in the notches of the upper bar, substantially as and for the purpose shown.

2. In combination with the upper and lower bars provided with corresponding notches in their front sides, the indicator-rods guided in such notches and having at or near their lower ends the forwardly-extending arms, the upright plates on such arms, and the fixed plate engaging the front sides of the indicator-bars near their upper ends, substantially as and for the purpose set forth.

3. In combination with the upper and the lower notched guide bars and the bar in front of the upper one, the indicator-rods sliding in the notches in the upper and lower bars and having arms extending forward from near their lower ends, the slotted plate F, the plates on the arms of the indicator rods, and the keys rigidly attached to such arms and extending through the slots in plate F, substantially as and for the purpose described.

4. In combination with the locking-bar provided with guide-arms, the open-sided guide-sockets for the arms on the locking-bar, and the swinging plates adapted to close with their ends the open sides of the sockets, substantially as and for the purpose shown.

5. In combination with the locking-bar having the upper and lower arms or lugs at its ends, the sockets for receiving and guiding the lower arms, the sockets for receiving the upper arms, open at one side, and the movable pieces for engaging the upper arms on the open sides of such sockets, substantially as and for the purpose set forth.

6. In combination with the locking-bar having the upper and lower guide arms on its ends, the guide-sockets for the lower arms, open on their upper sides, the open-sided sockets for the upper guide-arms, and the swinging stops adapted to engage with their ends the sides of the upper guide-arms not engaged by the sockets, substantially as and for the purpose described.

7. In combination with the sliding locking-bar K, the swinging plate adapted to engage a portion of the bar end, and the lock provided with the bolt having the inclined face adapted to engage the plate, substantially as and for the purpose specified.

8. In combination with the sliding bar K, the means for locking the same, consisting of the swinging plate provided with the inwardly-projecting portion adapted to engage a lug or arm on the bar, and the lock having the movable bolt provided with a cam-face or incline to engage the plate, substantially as and for the purpose shown.

9. In combination with the series of indicator-rods having the key-arms, and the short arms $e\ e$ on their lower ends below the key-arms, the swinging frame U, extending over and engaging these lower arms, and a spring suitably connected with the frame to draw it downward, substantially as and for the purpose set forth.

10. In combination with the alarm mechanism and the drawer, a locking device for the latter connected with the alarm mechanism, so as to be operated thereby, substantially as and for the purpose described.

11. In combination with the alarm mechanism and the drawer, the locking device for the latter, and means connected with the alarm mechanism to trip the locking device as the alarm mechanism moves to give the alarm, substantially as and for the purpose specified.

12. In combination with the alarm-striking lever, the drawer, and a locking device for the latter, means whereby the striking-lever in moving to strike the alarm actuates the locking device to unlock the drawer, substantially as and for the purpose shown.

13. In combination with the drawer and a locking device therefor, the lever connected with such device, and the bell-hammer lever adapted to engage and move the locking-device lever, substantially as and for the purpose set forth.

14. In combination with the drawer and the bolt for locking the same, the lever connected with the bolt, and the bell-hammer lever adapted to strike and actuate the bolt-lever, substantially as and for the purpose described.

15. In combination with the drawer-locking bolt and the lever connected therewith, the bell-hammer lever provided with a pin or lug to engage the bolt-lever, substantially as and for the purpose specified.

16. In combination with the drawer-locking bolt, the lever connected therewith, the spring engaging this lever, and the bell-hammer lever of the alarm mechanism, provided with means for engaging the bolt-lever, substantially as and for the purpose shown.

17. In an indicator, in combination with the drawer, the indicating devices, and an alarm mechanism connected with the indicating devices to give an alarm as an indication is made, the drawer-locking device adapted to be actuated by the alarm mechanism to unlock the drawer, substantially as and for the purpose set forth.

18. In an indicator, in combination with the drawer, the indicating devices, and the alarm mechanism connected with the indicating devices, so as to be operated thereby, the locking-bolt and the lever connected therewith adapted to be actuated by the alarm-striking lever of the alarm mechanism as such lever moves to strike the alarm, substantially as and for the purpose described.

19. In combination with the series of indicating devices, the alarm mechanism having the bell-hammer lever for striking the alarm, said lever having a pin or lug, connecting mechanism between the indicating devices and the alarm mechanism, the locking bolt, the lever connected therewith adapted to be engaged by the pin or lug on the hammer-lever, and the spring engaging the bolt-lever, substantially as and for the purpose specified.

20. In combination with the locking-bolt, the lever for operating the same, having the spring-arm and the inclined portion or projection thereon, and the hammer-lever provided with means for engaging the lever, substantially as and for the purpose shown.

21. In combination with the swinging bell-lever provided with a lug or pin, the locking-bolt and the lever connected therewith having the yielding arm provided with an inclined face to be engaged by the pin on the hammer-lever as the latter draws back for a stroke, and with a portion adapted to stand normally in the track of the said pin, substantially as and for the purpose set forth.

22. In combination with the locking-bolt, the drawer, the swinging plate thereon provided with an incline on its rear end to be engaged by the bolt and with the bolt engaging notch, the swinging plate above such notched plate having its rear end inclined, and means for swinging such plates inward toward each other, substantially as and for the purpose described.

23. In combination with the bolt and the drawer, the two swinging plates on the drawer, one above the other, having oppositely-inclined surfaces at their rear ends to engage the bolt as the drawer is being closed, and the lower one having a notch on its inner side, and means for normally swinging the plates inward toward each other, so that the upper plate covers the notch in the lower one, substantially as and for the purpose specified.

24. In combination with the lower swinging plate having the notch on its inner side and the inclined surface at its end, the upper swinging plate adapted to cover the notch in the lower plate when the two plates are swung inward toward each other, and having at its end an incline opposite to that on the other plate, and the spring acting to swing the plates toward each other, substantially as and for the purpose shown.

25. In combination with the locking-bolt, the drawer, and the plate thereon provided with a slot, the upper and lower plates pivoted under the slotted plate, so as to swing inward across the slot, having the opposite inclines at their rear ends, and the lower plate having the notch to engage the bolt, suitable stops to limit the inward swing of the plates, and the spring adapted to swing them inward, substantially as and for the purpose set forth.

26. In combination with the two series of register-wheels, the pawl-supporting rod or bar, the pawls pivoted thereon in pairs, of which one pawl engages the teeth of a wheel in one series and the other those of a wheel in the other series, the arms on the respective pawls of each pair, and the spiral springs connected at their opposite ends with such arms, substantially as and for the purpose described.

27. In combination with a series of hollow register-wheels, each provided within, on one side, with a fixed lug having an incline on its forward side with relation to the rotation of the wheel, the longitudinally-movable and rotary shaft provided with the series of pins, substantially as and for the purpose shown.

28. In combination with a register-wheel shaft, the means for shifting the shaft and holding the same as shifted, said means consisting of the independent cam-levers engaging the opposite ends of the shaft, substantially as and for the purpose set forth.

29. In combination with the two register-wheel shafts and the supports for their ends, a lever pivoted between the bearings of the shaft ends and provided with the two inclined or cam faces adapted to engage both the shafts, substantially as and for the purpose described.

30. In combination with the two register-shafts and suitable supports for the opposite ends thereof, the two cam-levers, each provided with the two inclines or cams to engage the corresponding ends of the two shafts as the levers are swung on their pivots, substantially as and for the purpose specified.

31. In combination with the two series of register-wheels provided with lugs, the two shafts for supporting the wheels, made longitudinally movable as well as rotary, and the two cam-levers for engaging the opposite ends of the shafts, each having the two cam-surfaces to engage the ends of both shafts at once, substantially as and for the purpose shown.

In testimony that I claim the foregoing I have hereunto set my hand this 14th day of December, A. D. 1886.

CABEL B. HOPKINS.

Witnesses:
W. T. HALE,
C. H. GIBSON.